United States Patent [19]
Tackles

[11] Patent Number: 5,774,201
[45] Date of Patent: Jun. 30, 1998

[54] ELLIPTICAL LENS FOR EYEWEAR

[75] Inventor: George J. Tackles, Capistrano Beach, Calif.

[73] Assignee: Oakley, Inc., Foothill Ranch, Calif.

[21] Appl. No.: 567,474

[22] Filed: Dec. 5, 1995

[51] Int. Cl.$^6$ .................. G02C 7/02; G02C 7/10
[52] U.S. Cl. .................. 351/159; 351/41; 351/44
[58] Field of Search .................. 351/159, 44, 47, 351/41

[56] References Cited

U.S. PATENT DOCUMENTS

| | | | |
|---|---|---|---|
| D. 145,288 | 7/1946 | Di Cicco | D57/1 |
| D. 163,869 | 7/1951 | Hinman | D57/1 |
| D. 176,316 | 12/1955 | Fleming | D57/1 |
| D. 178,178 | 7/1956 | Fleming | D57/1 |
| D. 187,394 | 3/1960 | Moeller | D57/1 |
| D. 199,150 | 9/1964 | Carmichael | D57/1 |
| D. 210,048 | 1/1968 | Imperatrice | D57/1 |
| D. 232,983 | 10/1974 | Rabuse | D2/234 |
| D. 268,683 | 4/1983 | Tenny | D16/102 |
| D. 285,020 | 8/1986 | Schmidthaler | D2/234 |
| 2,444,498 | 7/1948 | Cochran | 351/60 |
| 2,472,731 | 6/1949 | Splaine | 351/60 |
| 2,482,664 | 9/1949 | Gagnon | 351/108 |
| 2,582,345 | 1/1952 | Moeller | 351/44 |
| 3,133,982 | 5/1964 | Janz | 351/62 |
| 3,233,249 | 2/1966 | Baratelli et al. | 2/443 |
| 3,233,250 | 2/1966 | Jonassen | 2/14 |
| 3,531,189 | 9/1970 | Petito | 351/90 |
| 3,689,136 | 9/1972 | Atamian | 351/44 |
| 3,708,224 | 1/1973 | Linblom | 351/62 |
| 3,756,704 | 9/1973 | Marks | 351/60 |
| 4,515,448 | 5/1985 | Tackles | 351/41 |
| 4,564,272 | 1/1986 | Rinnooy Kan | 351/153 |
| 4,674,851 | 6/1987 | Jannard | 351/47 |
| 4,730,915 | 3/1988 | Jannard | 351/47 |
| 4,843,655 | 7/1989 | Hegendörfer | 2/449 |
| 4,867,550 | 9/1989 | Jannard | 351/47 |
| 4,951,433 | 8/1990 | Lin | 2/439 |
| 5,182,586 | 1/1993 | Bennato | 351/47 |
| 5,204,700 | 4/1993 | Sansalone | 351/41 |
| 5,208,614 | 5/1993 | Jannard | 351/41 |
| 5,245,709 | 9/1993 | Shipcott | 2/425 |
| 5,297,298 | 3/1994 | Salatka et al. | 2/447 |
| 5,321,443 | 6/1994 | Huber et al. | 351/47 |
| 5,359,370 | 10/1994 | Mugnier | 351/41 |
| 5,423,092 | 6/1995 | Kawai | 2/441 |
| 5,502,515 | 3/1996 | Sansalone | 351/41 |
| 5,604,547 | 2/1997 | Davis et al. | 351/159 |

FOREIGN PATENT DOCUMENTS

| | | |
|---|---|---|
| 0485155 | 7/1952 | Canada . |
| 0 121 018 A2 | 10/1984 | European Pat. Off. . |
| 673815 | 1/1930 | France . |
| 790755 | 11/1935 | France . |
| 2472764 | 7/1981 | France . |
| 2 617 294 A1 | 12/1988 | France . |
| 2 626 683 A1 | 8/1989 | France . |
| 2 688 322 A1 | 9/1993 | France . |
| 2700621 | 7/1994 | France . |

*Primary Examiner*—Scott J. Sugarman
*Attorney, Agent, or Firm*—Knobbe, Martens, Olson & Bear, LLP

[57] ABSTRACT

Disclosed is a lens for eyewear, the lens having a substantially elliptical cross-section in a horizontal plane. A horizontal cross-section of the lens may conform to an ellipse of eccentricity between about 0.10 and about 0.85, and the lateral ends define an elliptic arc of preferably at least about 140°. The lens may have any of a variety of configurations in the vertical planes, independent of the horizontal elliptical shape. Additionally, the lens may be of uniform thickness or of tapering thickness from a relatively thicker medial portion to thinner lateral portions. The elliptical lens of the present invention may be used in unitary- or dual-lens eyewear.

11 Claims, 9 Drawing Sheets

ELLIPTICAL LENS FOR EYEWEAR

The present invention relates generally to lenses used in eyewear, and more particularly to at least the horizontal curvature of such lenses.

BACKGROUND OF THE INVENTION

A wide variety of improvements have been made in recent years in the eyewear field, particularly with respect to eyewear intended for use in active sports or as fashion sunglasses. These improvements have been incorporated into eyewear having a unitary lens, such as the "Blades"® design (Oakley, Inc.) and the "M Frame"® line (also from Oakley, Inc.), or into eyewear having dual lenses, such as the "Zero"® line produced by Oakley, Inc. These eyewear designs accomplish any of a variety of functional advantages, such as maximizing interception of peripheral light, reducing optical distortion and increasing the wearer's comfort level, relative to previous active sport eyewear.

The unitary lens of the "Blades"® eyewear incorporates the cylindrical geometry disclosed for example in U.S. Pat. No. 4,859,048, issued to Jannard. This geometry allows the lens to closely conform to the wearer's face and intercept light, wind, dust, etc. from directly in front of the wearer (anterior direction) and peripherally (lateral direction). At the same time, ventilation is provided at the lateral ends of the lens and between the wearer's cheek and the bottom of the lens, to reduce fogging of the lens during active use. Due to close conformity of the lens to the wearer's face, however, if a sufficient volume of air fails to flow through the ventilation gaps, the volume of air between the lens and the face can become saturated with moisture.

Figure 6:
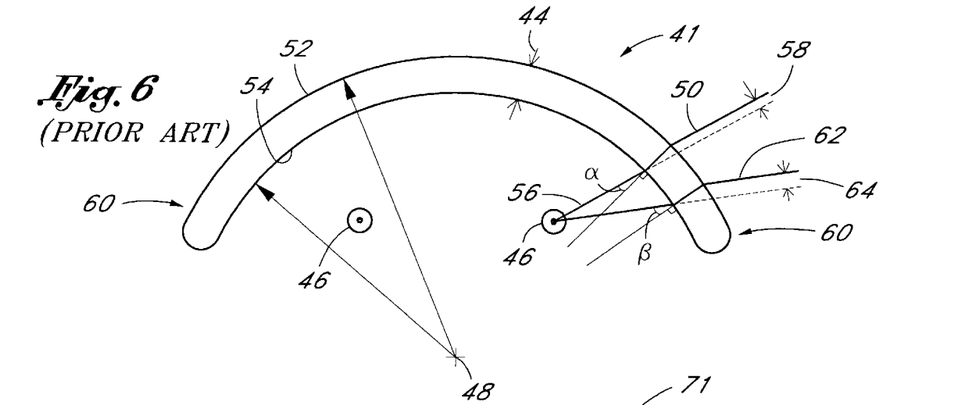
FIG. 6 is a schematic horizontal cross-sectional view of a prior art horizontally circular unitary lens of uniform thickness, and light paths taken through the lens to the eye of a wearer.
Figure 7:
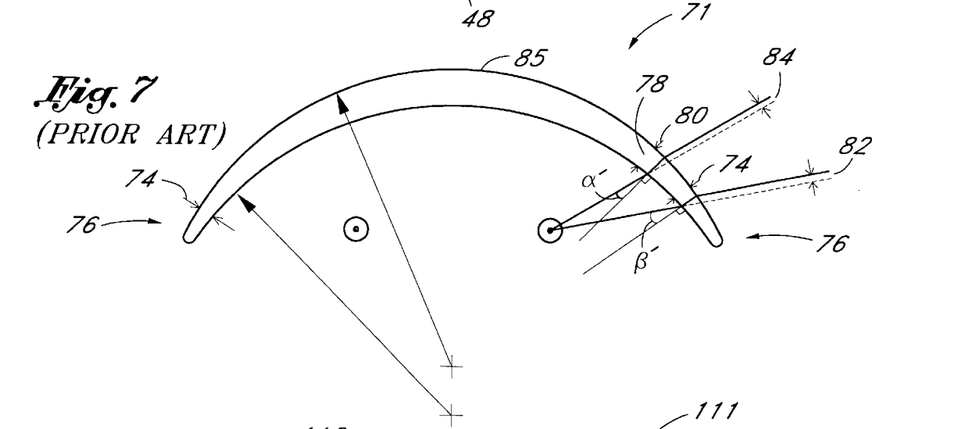
FIG. 7 is a schematic horizontal cross-sectional view of a prior art horizontally circular unitary lens of tapered thickness, and light paths taken through the lens to the eye of a wearer.

In the unitary cylindrical lens of uniform thickness, the angle of incidence from the wearer's eye to the lens surface increases in the lateral direction, as apparent from FIG. 6. This results in disparate refraction between medial light entering at the front of the lens and peripheral light entering at the lateral ends. To address this disparity, U.S. Pat. No. 4,859,048 discloses a lens of tapering thickness from the medial portion toward the lateral edge, as shown in FIG. 7.

Prior art eyewear has also employed dual lens systems in which two separate lenses are mounted along a generally curved front frame. The discontinuity of radius at the juncture of such sub-lenses, however, can produce optical distortions rendering them suboptimal for any activity in which maximum visual acuity is required, such as in many sporting applications.

Because the eyeball's pupil does not generally sit at the center of curvature or axis of a close-fitting spherical or cylindrical lens, the angle of incidence from each pupil to the lens surface changes through the angular range of vision, in both the unitary and dual lens systems. Additionally, prior art lens geometries tend to entrap small volumes of air which may become moisture-laden in active use, causing fogging.

Thus, despite recent advancements, a need exists for a lightweight lens which can intercept light over the full angular range of vision and minimize optical distortion over the same range. At the same time, such eyewear should minimize the risk of lens fogging during active use.

SUMMARY OF THE INVENTION

There has been provided in accordance with one aspect of the present invention a single pane, unitary lens for eyeglasses. The lens has an upper edge and a lower edge, and the lower edge has a nosepiece opening formed therein for mounting the lens on the nose of a wearer.

The lens is provided with an arcuate cross-sectional configuration along a horizontal plane, and the curvature of the arc conforms substantially to a portion of the surface of an ellipse. Preferably, the ellipse has an eccentricity within the range of from about 0.10 to about 0.85. In a preferred embodiment, the lens has a thickness which is greatest in a medial region of the lens and which is thinnest in lateral edges of the lens, and which tapers continuously from the medial region to the lateral regions.

In accordance with another aspect of the present invention, there is provided a pair of eyeglasses having dual lenses. Each lens in the dual lens system comprises at least one surface which conforms substantially to a portion of the surface of an ellipse.

Further features and advantages of this present invention will become apparent from the detailed description of preferred embodiments which follows, when considered together with the attached claims and drawings.

DETAILED DESCRIPTION OF THE PREFERRED EMBODIMENTS

Figure 1:
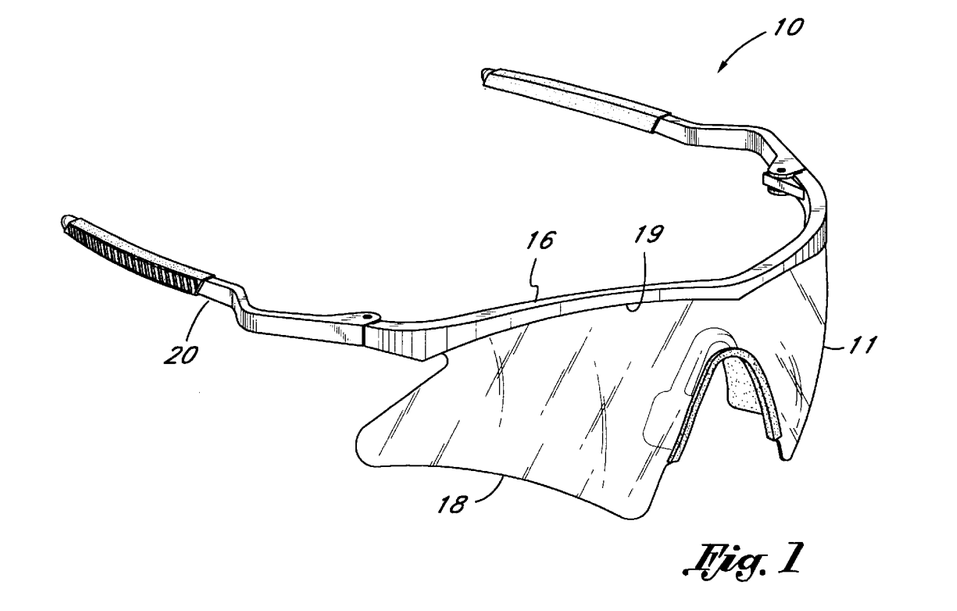
FIG. 1 is a perspective view of eyewear incorporating a unitary lens made in accordance with an embodiment of the present invention.
Figure 2:
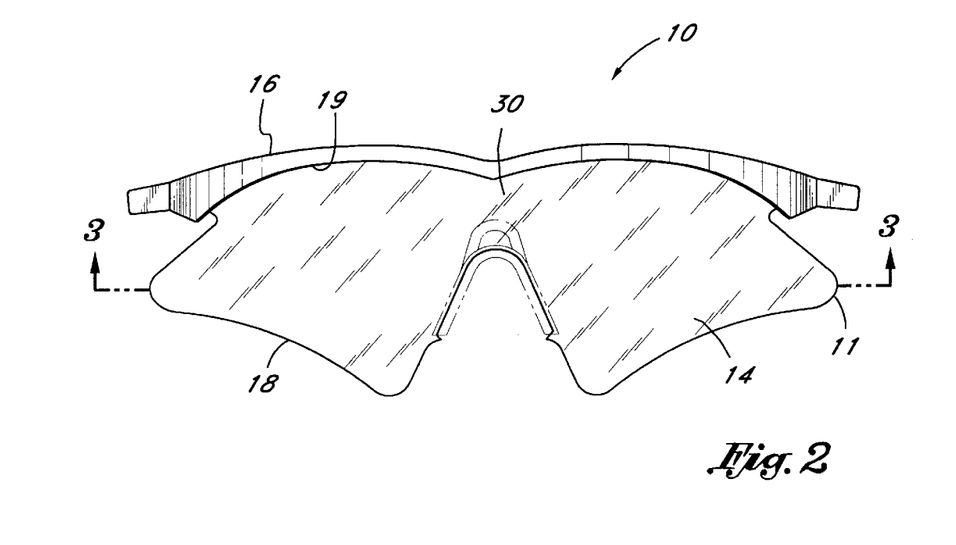
FIG. 2 is a front elevational view of the eyewear of FIG. 1.

Referring initially to FIGS. 1 and 2, there is illustrated an eyeglass or eyewear 10 having a unitary lens 11 constructed in accordance with an embodiment of the present invention. The view in FIG. 2 illustrates more clearly the two dimensional front elevational shape of the outer surface 14 of the lens 11 of FIG. 1. The present invention, however, relates to the lens curvature in the dimension normal to the view of FIG. 2. Therefore the particular illustrated lens shape revealed in the front elevational view is not critical to the invention. Rather, lenses of many other shapes may be envisioned which will accrue the advantages of the present invention.

Similarly, the particular mounting frame 16 shown is not essential to the present invention. The frame may bound the bottom edge 18 of the lens 11, the entire lens 11, or any other portion as will be evident to those of skill in the art. Preferably, though, the lens 11 is mounted in the eyewear 10 with a top frame 16 as shown, extending along at least a portion and preferably the entire upper edge 19 of the lens 11, and secured by conventional means. Such an arrangement reduces the weight and bulk of the eyewear 10 while allowing a greater peripheral and lower range of vision. A pair of earstems 20 pivotally attach to the frame 16. Alternatively, the earstems 20 may attach directly to the lens 11. The frame advantageously consists of any of a variety of metals, composites or relatively rigid, molded thermoplastic materials which are well known in the art, and may be transparent or any of a variety of colors.

Figure 3:
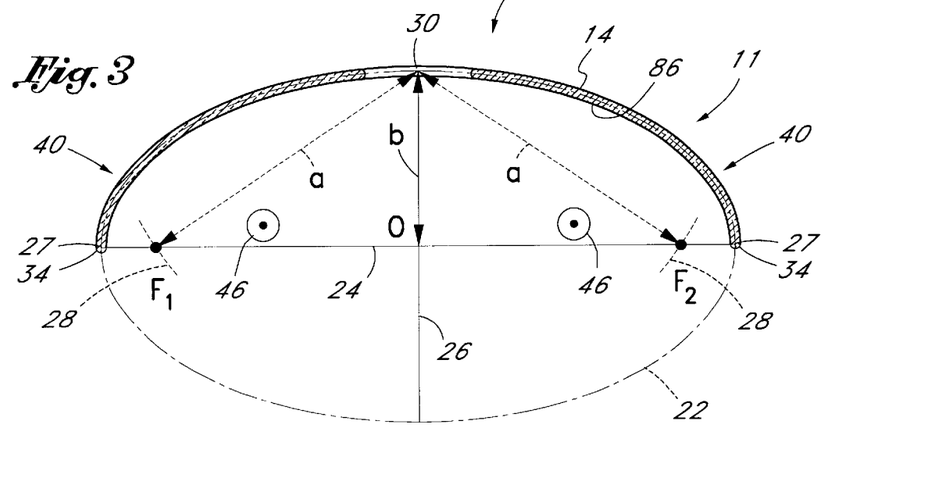
FIG. 3 is a horizontal cross-sectional view taken along lines 3—3 in FIG. 2, showing conformity to an ellipse.

The lens 11 of the present invention is substantially elliptically curved in the horizontal plane, as best seen from the sectional view of FIG. 3. An ellipse 22 is a smooth curve, slightly flattened in relation to a circle. The lens of the present invention may deviate slightly (e.g., ± no more than about 15% and preferably no more than about 10%) from a mathematically exact ellipse 22 without departing from the spirit of the present invention. The horizontal elliptical shape is independent of the lens' vertical side profile, which may take any of a number of shapes, as will be described. Thus, a lens having a horizontally elliptical shape may accrue the advantages of the current invention regardless of the profile in the vertical dimension.

Lenses in accordance with the present invention can be manufactured by any of a variety of processes well known in the art. Preferably, the lens is injection molded and comprises a relatively rigid and optically acceptable material such as polycarbonate. The substantially elliptical curvature of the present invention would thus be incorporated into a molded lens blank. Lenses produced this way are preferably formed into the desired shape in their as molded condition. Preferably, the frame is provided with a slot or other attachment structure that cooperates with the molded shape of the lens to minimize deviation from, and even improve retention of that as molded shape.

Alternatively, the lens can be stamped or cut from flat sheet stock and then bent into the curved configuration in accordance with the present invention. This curved configuration can then be maintained by the use of a relatively rigid, curved frame, or by heating the curved sheet to retain its curved configuration, as is well known in the thermoforming art.

FIG. 3 shows an ellipse 22, in phantom, to which the lens 11 substantially conforms. Each lens has an outer, convex surface and an inner, concave surface with a thickness therebetween. In the embodiment illustrated in FIG. 3, the lens thickness is substantially constant throughout the horizontal arc length of the lens so that a midline between the inner surface and the outer surface lies on the ellipse. In general, at least one of the inner surface and the outer surface will conform to the surface of an ellipse, and the following discussion should be considered accordingly.

Both the major axis 24, of half-length or semimajor axis a, and the minor axis 26, of half-length or semiminor axis b, are shown. The major axis extends from one vertex 27 to another 27. Once the major and minor axes, 24 and 26, have been chosen, a pair of focal points $F_1$ and $F_2$ can then be determined. They can be located by drawing a pair of arcs 28 of radius a (the semimajor axis), centered on an apex 30 of the minor axis 26. The intersections of those arcs 28 with the major axis 24 define the focal points $F_1$ and $F_2$.

Figure 4:
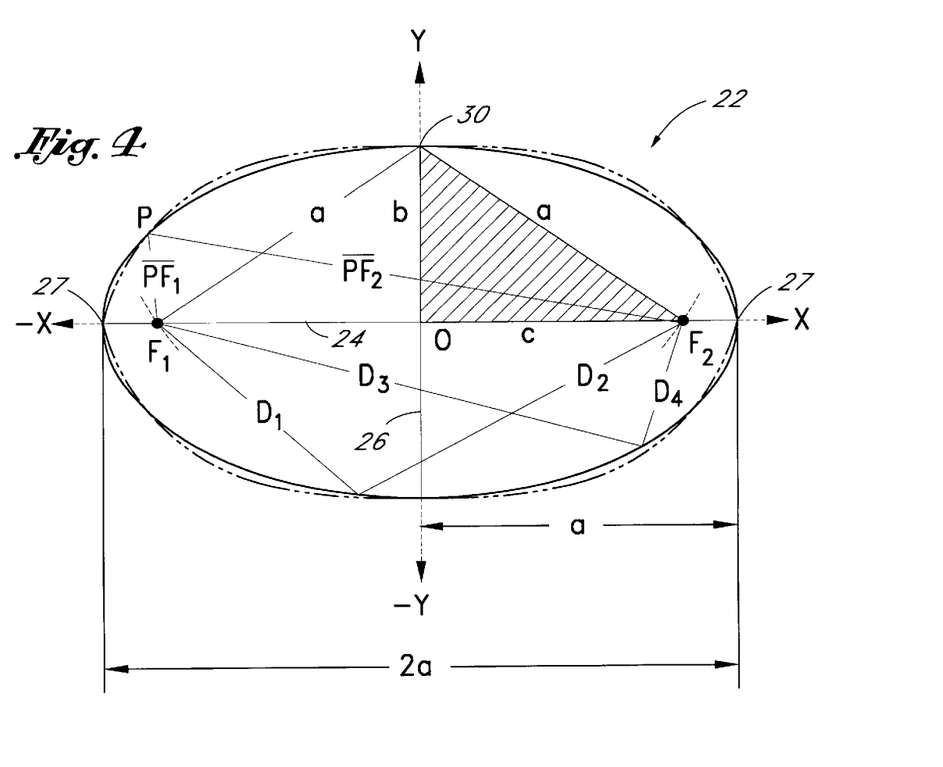
FIG. 4 is a representation of a geometrically correct ellipse with a range of acceptable deviations and showing mathematical properties of the ellipse.

Referring now to FIG. 4, the ellipse 22 of FIG. 3 is shown. The eccentricity e of the ellipse 22 defines the degree of departure of the ellipse 22 from a circular shape. It is a measure of the flatness of the ellipse 22. Defining the distance from a center O of the ellipse 22 to each focal point $F_1$ or $F_2$ is c (also defined as half the distance between the focal points $F_1$ and $F_2$), the eccentricity is defined as $$e = c/a. \qquad (1)$$

For a circle, the focal points converge so that c=0 and therefore e=0. For a line, the focal points are the end points of the "ellipse" so that a (half the major axis)=c (half the distance between focal points) and therefore e=1. Both lines and circles are technically mathematical ellipses, but they do not confer the advantages of the present invention. Since the present invention requires a certain flatness of curvature, but not so flat as to describe a line, an ellipse for the purposes of the present invention will be defined as one with eccentricity between 0 and 1 noninclusive, or $$0 > e > 1. \qquad (2)$$

Figure 5:
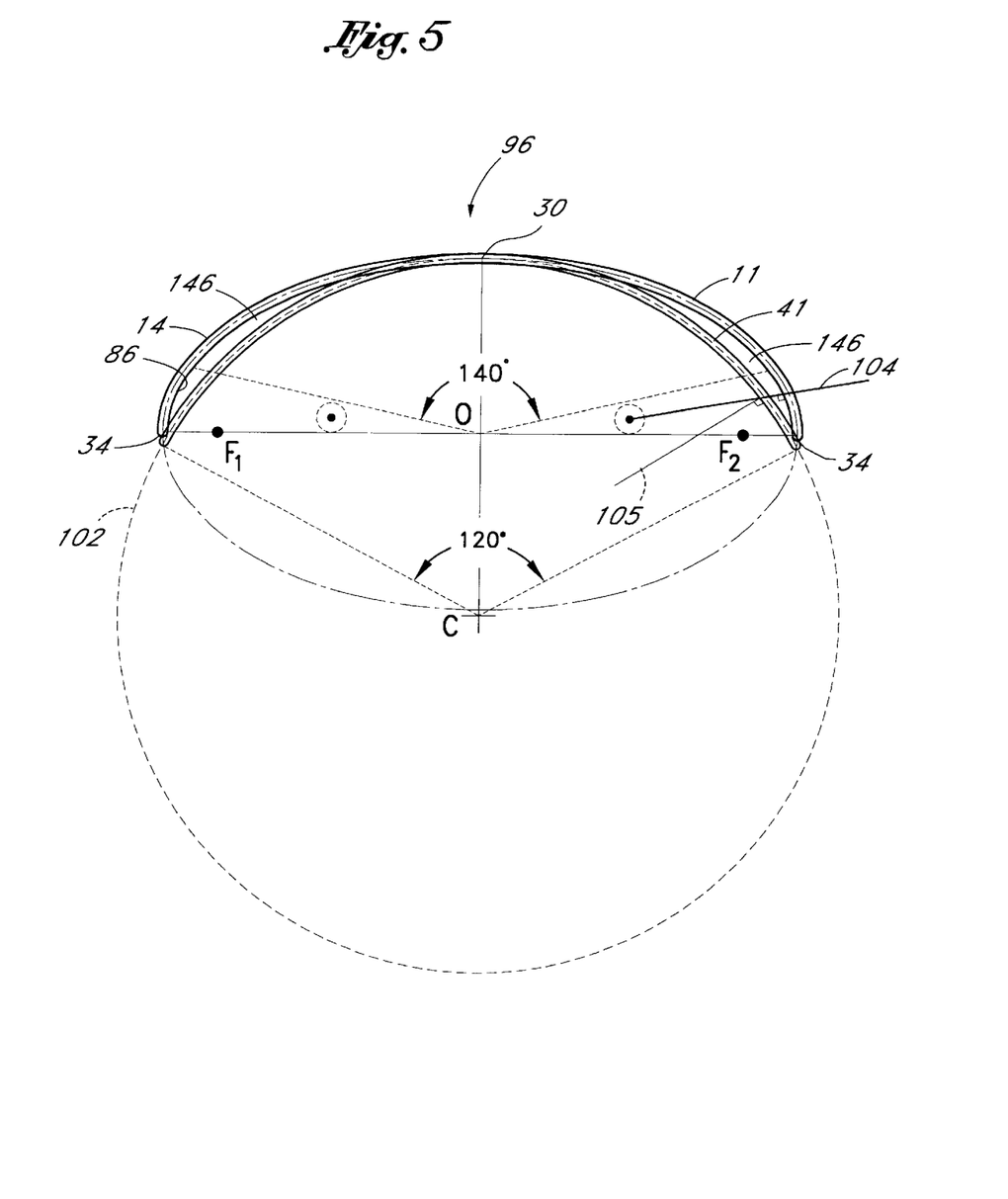
FIG. 5 is a horizontal cross-sectional view of a unitary elliptical lens overlying a horizontal cross-section of a prior art horizontally circular unitary lens.

Thus, the minor axis 26 must be greater than zero, and must not equal the major axis 24. FIG. 5 contrasts the present elliptical lens 11 with a prior art circular lens, both shown in cross-section. Prior art lenses having a circular curvature in the horizontal plane are known, for example, in lenses conforming to the surface of a cylinder or a sphere.

The eccentricity of the unitary lens 11 of the present invention can vary within a preferred range. It has been found that lenses having eccentricity ranging between about 0.10 and about 0.85, preferably between about 0.40 and 0.80, and most preferably about 0.60, will comfortably fit on most faces. Comfortable fit is determined by the spatial relationship between the wearer's temples, at approximately which a pair of lateral edges 34 of the lens 11 should terminate, and the bridge of the wearer's nose, upon which the apex 30 of the elliptic lens 11 should rest. This eccentricity range remains acceptable for lenses of different absolute sizes, since large and small faces will generally be proportional.

Figure 8:
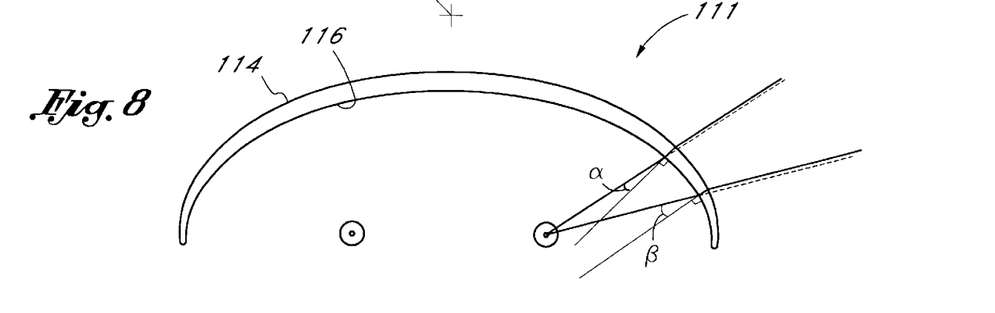
FIG. 8 is a schematic horizontal cross-sectional view of an elliptical unitary lens constructed in accordance with an embodiment of the present invention, and light paths taken through the lens to the eye of a wearer.

The elliptical shape of the present lens 11 tends to reduce optical distortion introduced by refraction of light rays through a lens of non-zero thickness, especially of peripheral rays approaching lateral ends 40 near the lateral edges 34. FIGS. 3 and 6 to 8 illustrate the contrast between optical distortion produced by prior art lenses and that of the present invention. FIGS. 6 and 7 show prior art lenses and FIGS. 3 and 8 show corresponding embodiments of the present invention. Note that any refraction in these drawings is exaggerated for purposes of illustration. Angles of incidence referred to are measured with respect to a normal to the lens surface at the point of incidence. Thus, light rays perpendicular to the lens are said to have an angle of incidence of 0°. For convenience, the angle of incidence is drawn on the transmitted light ray travelling from an inner lens surface to the eye. It is assumed, for the purposes of this discussion, that the inner and outer surfaces of the lens are substantially parallel to one another insofar as transmitted rays are concerned.

FIG. 6 schematically illustrates refraction in a prior art unitary lens 41 of circular horizontal cross-section, having a uniform thickness 44. With such a unitary lens 41, neither of a pair of eyes 46 are positioned at the center of curvature 48. Thus, the angle of incidence of rays from the lens 41 to each eye 46 changes throughout the angular range of vision. For example, a ray which shall be referred to as a medial light ray 50 strikes the lens 41 at an angle a to the normal. As is well known in this art, bending of light at transmitting surfaces depends in part upon the angle of incidence of light rays. The ray 50 is refracted or bent in opposite directions at each of an outer surface 52 and an inner surface 54 of the lens 41, resulting in a transmitted ray 56 parallel to the incident ray 50. The transmitted ray 50 is displaced, relative to the path of the incident ray 50, by a distance 58. This displacement is a first order source of optical distortion.

Furthermore, refractory displacement is even more pronounced at a lateral end 60 due to a greater angle of incidence β. A peripheral incident ray 62 experiences greater displacement 64 than the medial incident ray 50. The discrepancy between the peripheral ray displacement 64 and the medial ray displacement 58 results in a second order of optical distortion.

To compensate for the greater angle of incidence at the lateral ends 60 of the lens 41, U.S. Pat. No. 4,859,048 issued to Jannard discloses a cylindrical lens 71 of tapered thickness, illustrated schematically in FIG. 7. Light is bent within the tapered lens 71 to about the same degree as in the untapered prior art lens 41 at corresponding radial points. However, tapering produces a smaller lens thickness 74 at a lateral end 76, relative to a lens thickness 78 at a more medial point 80. This smaller thickness 74 reduces an amount of peripheral ray displacement 82, relative to the peripheral ray displacement 64 through the untapered lens 41 of FIG. 6. In other words, lesser lens thickness 74 at the lateral end 76 of the tapered lens 71 compensates for a greater angle of incidence β, relative to the thickness 78 and angle of incidence α at the medial point 80.

The resulting difference between peripheral ray displacement 82 and medial ray displacement 84 on the same lens 71 is not as great as the corresponding difference in FIG. 6, reducing the second order optical distortion. Note that the degree of correction of the second order distortion depends upon the differential thickness from the apex 85 to each lateral end 76.

By way of contrast, the elliptic lens 11 in a nontapered embodiment of the present invention is shown in FIG. 3. Light rays pass through the lens 11 to the wearer's eye 46 more closely normal to the lens outer and inner surfaces, 14 and 86, throughout the wearer's angular range of vision. This results in a lesser refractory displacement at each point along the lens 11, relative to non-elliptical lenses, and thus lesser first order optical distortion. Furthermore, there is less discrepancy between the displacement of a medial ray 92 and displacement of a peripheral ray (not shown) because of the tightening curvature toward the lateral ends 40.

Specifically, a relatively flat medial portion 96 of the unitary lens 11 extends across both eyes. This flat portion 96 intercepts light rays travelling nearly normal through the lens 11 to each of the wearer's eyes 46. At the same time, gradually tightening curvature results in the lateral end 40 of the lens 11 also intercepting nearly normal light rays en route to the wearer's eye 46.

The reduced discrepancy between medial and peripheral displacement is due to the fact that an elliptic arc of substantially 180° from one lateral edge 34 to the other, may approximately satisfy the apex and lateral edge parameters set by the dimensions of a human face. In such a case, the lateral edges 34 of the lens correspond to vertices 27 of an ellipse 22 (see FIG. 4). In contrast, a unitary spherical or a cylindrical lens 41 conveniently conforms to a circular arc 102 of only about 120°, as is apparent from FIG. 5. Thus, a peripheral ray 104 strikes the circular lens 41 at an angle to a normal 105 while the same ray 104 would strike the elliptical lens 11 substantially normal to the lens 11 surface.

It is not necessary that the lateral edges 34 of the lens 11 coincide with the vertices 27 of the ellipse. Instead, the lens may conform to an elliptic arc of less than 180° while still intercepting peripheral light with minimal distortion. The lower limit of the radial arc length depends upon the eccentricity of the ellipse chosen. For most eyewear applications, the elliptic arc defined by the lens' lateral edges should be at least about 140° in a unitary lens system. It is possible, however, to have a lens of even smaller arc, e.g. 120°, whereby ventilation is provided through the open sides.

Despite the reduced second order optical distortion, the elliptic lens 11 of uniform thickness does display some discrepancy between refraction and displacement of peripheral rays 104 through the lateral ends 40 as compared to refraction and displacement of more medial rays. To compensate for any such discrepancy, a tapered embodiment 111 of the present invention is provided and illustrated schematically in FIG. 8. Because less of such discrepancy occurs with the uniformly thick elliptic lens 11 of the present invention than with uniformly thick prior art lenses 41, however, a more gradual taper may be used compared to the tapered prior art lens 71.

In order to construct the tapered embodiment of FIG. 8, both the convex outer surface 114 and the concave inner surface 116 of the lens 111 may be configured to conform to overlapping and offset ellipses (not shown). Preferably, the ellipses should be substantially identical to one another as shown, but they may be of different geometry. In either case, overlapping ellipses result in convergent arcs which in turn define evenly the tapered lens 111 with minimal distortion. Alternatively, it is possible to vary the thickness along the lens at any other rate, provided that at least one and preferably both of the inner and outer surfaces remain substantially elliptical, as will be defined below.

On the other hand, the uniformly thick lens 11 of FIG. 3 comprises the outer surface 14 and the inner surface 86 which conform to substantially concentric and proportional ellipses (not shown).

One desirable quality of the lenses of the present invention which substantially conform to a portion of the surface of an ellipse is the smoothness of curvature. It has been found that lenses substantially conforming to a mathematically correct ellipse result in better optical clarity than lenses having discontinuous portions (e.g., bent portions near the lateral ends, added side blinders, fusion of lenses having differing radii etc.).

Referring again to FIG. 4, a mathematical ellipse 22 is defined as a path along which, at any given point on the locus, the sum of the distances to each of the focal points $F_1$ and $F_2$ is equal to the length of the major axis 24 (2a). For any point P on the ellipse 22, the distances to each focal point are related as follows:

$$PF_1 + PF_2 = 2a \quad (3)$$

Thus, for the segment lengths $D_1$, $D_2$, $D_3$ and $D_4$ of the mathematically correct ellipse 22 of FIG. 4, $$D_1 + D_2 = D_3 + D_4 = 2a. \quad (4)$$

If the major axis 24 of FIG. 4 represents the x-axis of a coordinate system, and the minor axis 26 represents the y-axis, the precise mathematical formula for defining the locus of the ellipse 22 relative to the intersection O of the axes 24 and 26 is $$x^2/a^2 + y^2/b^2 = 1 \quad (5)$$

where x, y are the coordinates of any point on the ellipse 20, a is the semimajor axis and b is the semiminor axis.

It has been determined, however, that the elliptical shape of the present invention need not be mathematically precise in order to attain acceptable deviation from the attributes described above. Rather, the locus of the ellipse may deviate somewhat from the formulas above and still attain the characteristics herein described. Particularly, it has been found that the sum of the distances from a point P, on the lens' elliptical cross-section, to the focii $F_1 + F_2$ should equal the length of the major axis 26 (22) give or take 15%, preferably ±10%, and more preferably ±5%. Thus, for example, equation (3) may be written as $$PF_1 + PF_2 = 2a(1 \pm 0.1). \quad (6)$$

An imperfect but acceptable ellipse 121 satisfying Equation (6) is illustrated in FIG. 4.

Note that the lens 11 conforming to the above formula "encloses" a greater volume of air, than the prior art horizontally circular lens 41 as evident from FIG. 5. FIG. 5 illustrates the elliptical lens 11 of FIG. 1 with a horizontally circular lens 41 superimposed. Such circular (constant radius) horizontal curvature describes many prior art lenses, such as spherical, cylindrical or toroidal lenses. For the given apex 30 and lateral edges 34, the elliptical lens 11 encloses a greater volume of air than the circular lens 41, as indicated by a differential space 146 in FIG. 5. The smoothly changing curvature of the elliptical lens 11 allows the lens 11 to remain relatively flat near the apex 30 and yet wrap around the wearer's face near the lateral edges 34.

Depending upon the vertical configuration and front elevational shape of the lens, the differential space 146 provided by the horizontally elliptical curvature may be helpful in reducing fogging in a number of embodiments. For example, some eyewear may utilize a vertical curvature of the lens 11 (discussed below in more detail) designed to create a seal or a near seal between the lens and the wearer's face, such as ski or swim goggles. When such vertical curvature is used in combination with elliptical horizontal curvature, a larger volume of air is entrapped than in eyewear using horizontally circular curvature, such as a traditional constant horizontal radius lens. More moisture is required to saturate a larger volume of air, thus potentially delaying the onset of condensation on the inner surface 86 of the lens 11.

Where neither watertight, nor airtight seals are required, the eyewear's vertical curvature and front shape may be advantageously shaped to provide a ventilation gap between the bottom edge 18 of the lens 11 and the wearer's face. Such a ventilation gap, allows moisture-laden air to more easily escape from beneath the lens 11 and thus minimizes the risk of condensation or fogging. Even under conditions where air does not readily flow out the ventilation gaps provided, the larger volume of air effectively trapped by the elliptical lens 11 delays or reduces the risk of fogging.

The shape of the lens, as seen from a front elevational view such as FIG. 2, may be any of various shapes. The shape shown in FIG. 2 is adapted from the disclosure of U.S. Pat. No. 5,208,614 to Jannard the disclosure of which is incorporated herein by reference. That patent discloses a concavely indented bottom edge 18 of the lens 11. It will be understood, though, that the above-described advantages of the present invention are within broad limits substantially independent of the front elevational shape.

Since the horizontal elliptical configurations of the above-described embodiments of the present invention are to a large extent independent of the lenses' vertical configurations, a variety of vertical configurations are possible.

Figure 21:
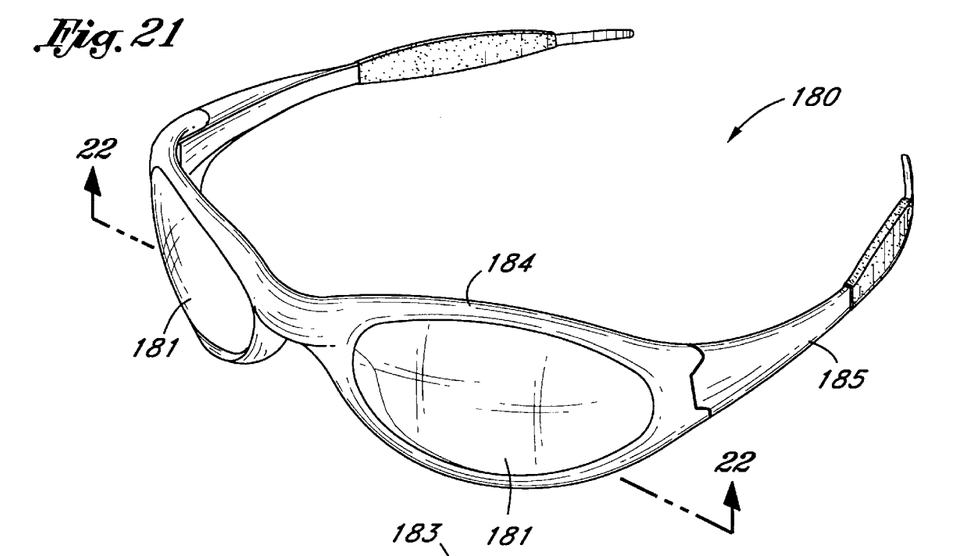
FIG. 21 is a perspective view of eyewear having dual elliptical lenses constructed in accordance with an embodiment of the present invention.
Figure 22:
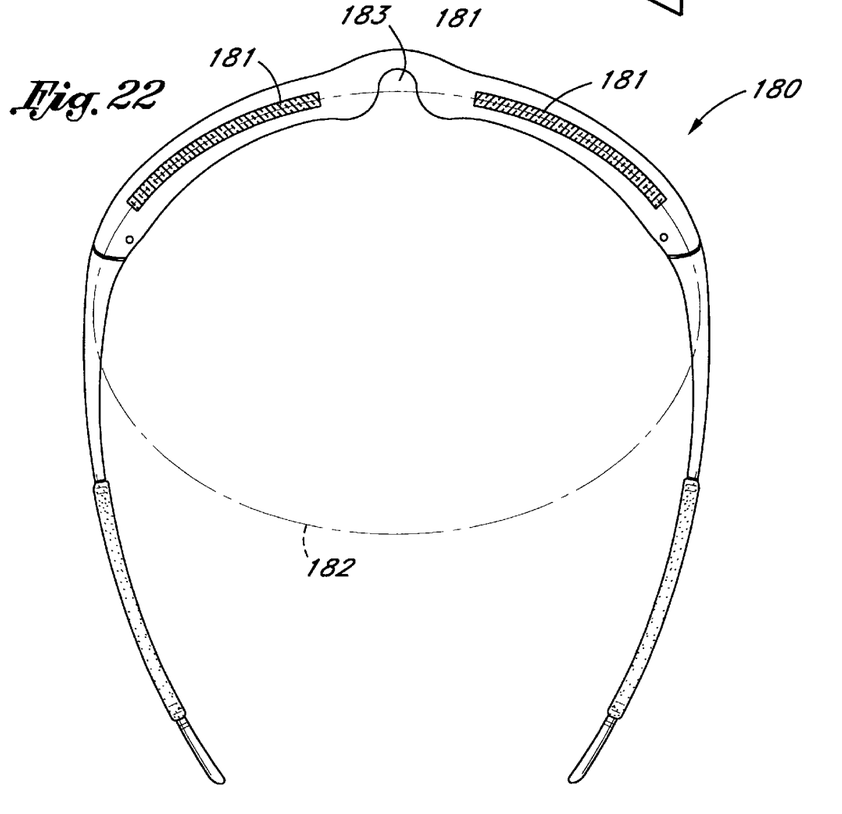
FIG. 22 is a cross-sectional view taken along lines 22—22, shown conforming to a single ellipse.
Figure 23:
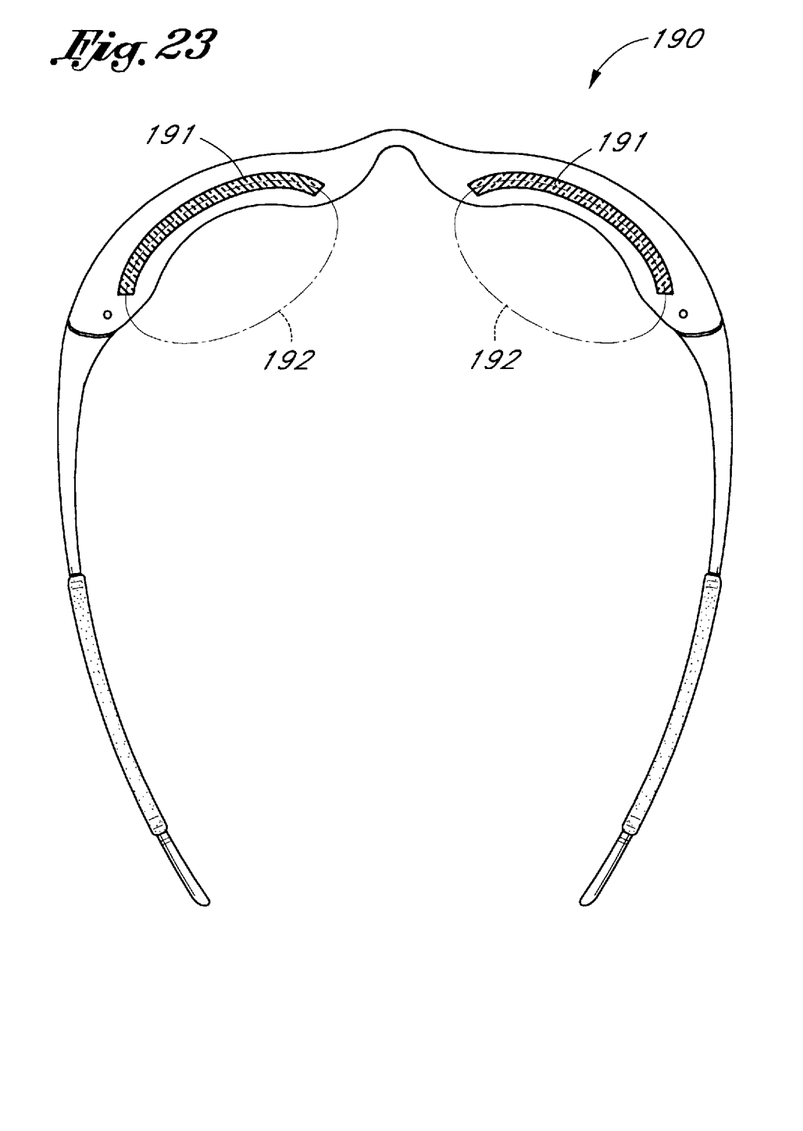
FIG. 23 is a horizontal cross-sectional view, like FIG. 22, of eyewear comprising dual elliptical lenses constructed in accordance with a different embodiment of the present invention, shown conforming to separate ellipses.

FIGS. 9 through 23 illustrate several lenses constructed in accordance with the present invention, having various three-dimensional configurations. Although the unitary lenses of FIGS. 9–20 all have similarly elliptical horizontal configurations in accordance with the present invention (see FIG. 3), the different embodiments have different vertical profiles, as seen in FIGS. 10, 12, 14, 17 and 20. Furthermore, FIGS. 21–23 illustrate dual-lens eyewear into which the present invention may be incorporated. The embodiments of FIGS. 9–23 are included by way of demonstrating the variety of lenses in which the present invention may be incorporated, and not by way of limitation. Those skilled in this art will recognize that many other embodiments are possible.

Figures 9, 10:
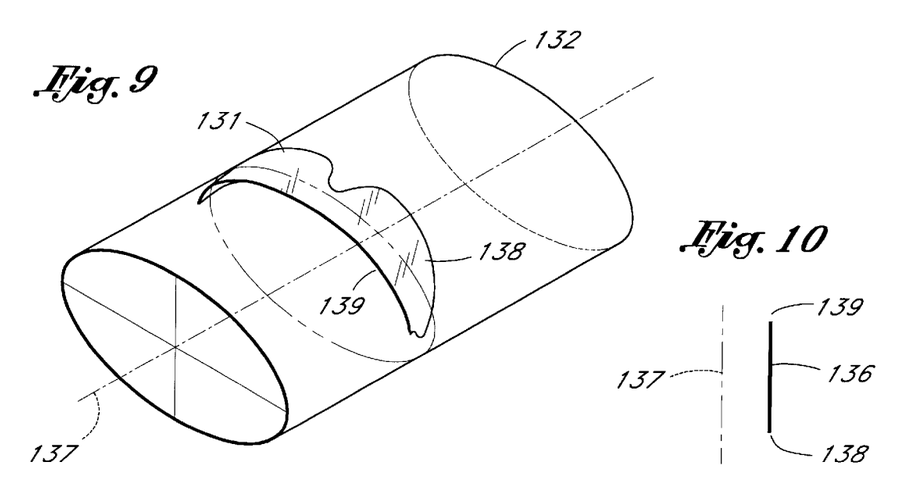
FIG. 9 is a perspective view of an elliptical unitary lens made in accordance with an embodiment of the present invention, shown conforming to an elliptic cylinder.
FIG. 10 is a schematic side view of the lens in FIG. 5, showing the vertical profile of the lens relative to a vertical axis of the elliptic cylinder.

FIG. 9, for example, shows an embodiment in which a lens 131 substantially conforms to an elliptic cylinder 132. The elliptic cylinder 132 to which the lens 131 conforms is shown to aid an understanding of the lens' three-dimensional configuration, and not necessarily to demonstrate a method a manufacture. FIG. 10 schematically illustrates a vertical profile 136 of such a lens, which is generally parallel to an axis 137 of the elliptic cylinder 132. Such an embodiment typically provides relatively large ventilation gaps at the bottom edge 138 and upper edge 139 of the lens 131 when the eyewear is worn.

Figures 11, 12:
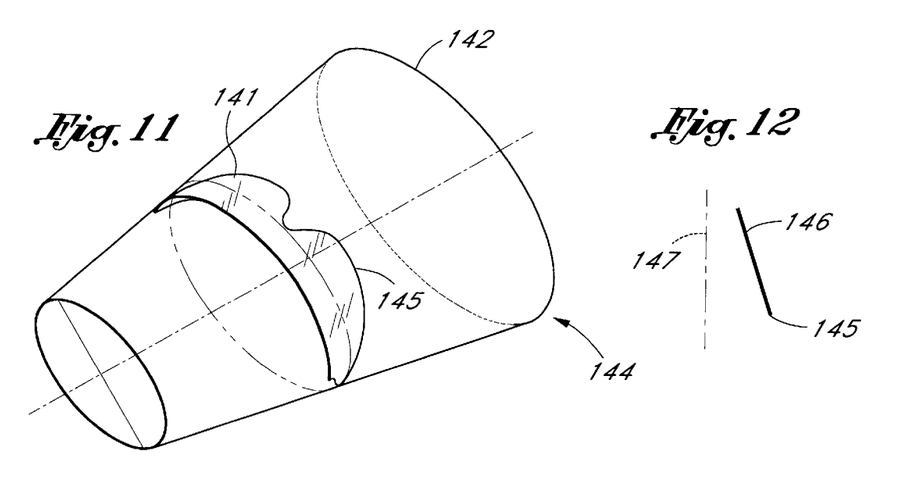
FIG. 11 is a perspective view of an elliptical unitary lens made in accordance with an embodiment of the present invention, shown conforming to an elliptic cone.
FIG. 12 is a schematic side view of the lens of FIG. 11, showing the vertical profile of the lens relative to a vertical axis of the elliptic cone.

FIG. 11 illustrates an embodiment in which a lens 141 substantially conforms to an elliptic cone 142. A wider end 144 of the cone 142 may correspond to either a bottom edge 145 or top edge of the lens 141. In the illustrated embodiment, considerable ventilation is provided between the wearer's cheeks and the bottom edge 145 of the lens 141. It will be understood, however, that a similar embodiment may be constructed, in which the bottom edge of the lens corresponds with the narrower end of the cone. Such a construction conforms more closely to the shape of the human face, tending to improve streamlining while maximizing interception of outside light, wind, particles, etc. FIG. 12 schematically shows the vertical profile 146 of the lens of FIG. 11, angled with respect to an axis 147 of the elliptic cone 142.

Figures 13, 14, 15, 16, 17, 18:
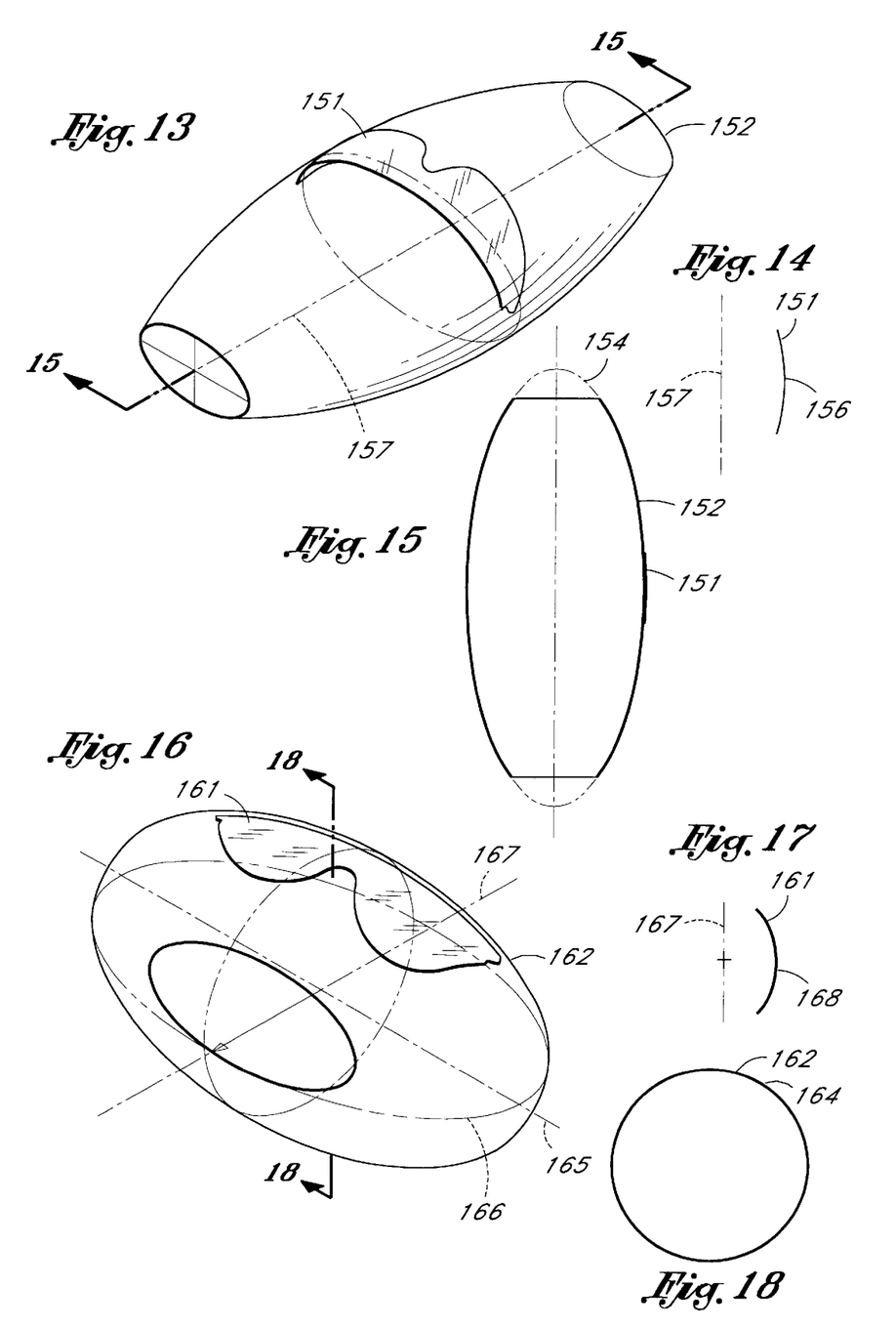
FIG. 13 is a perspective view of an elliptical unitary lens made in accordance with an embodiment of the present invention, shown conforming to an ellipsoid.
FIG. 14 is a schematic side view of the lens of FIG. 13, showing a vertical profile of the lens relative to a vertical axis of the horizontal ellipses.
FIG. 15 is a cross-sectional view taken along lines 15—15 of FIG. 13.
FIG. 16 is a perspective view of an elliptical unitary lens made in accordance with an embodiment of the present invention, shown conforming to an ellipsoid of revolution.
FIG. 17 is a schematic side view of the lens of FIG. 16, showing the vertical profile of the lens relative to a vertical axis of the horizontal ellipses.
FIG. 18 is a cross-sectional view taken along lines 18—18 of FIG. 16, showing the maximum radius circular cross-section of the ellipsoid of revolution of FIG. 16.

FIG. 13 illustrates an embodiment in which a lens 151 substantially conforms to an ellipsoid 152, which produces elliptical cross-sections in all three coordinate planes. For example, FIG. 15 shows one such cross-sectional ellipse 154. A vertical profile 156 of the lens 151 is shown conforming to this ellipse 154. FIG. 14 schematically illustrates an alternate vertical profile relative to an axis 157 of the ellipsoid 152, for purposes of comparing the vertical profiles of the various illustrated embodiments. Generally, however, the vertical profile will extend across a relatively flat portion of the ellipse as seen in FIG. 15 rather than from the vertex to vertex as shown in FIG. 14.

The profile 156 of FIG. 14 may have a different elliptic curvature than the horizontal cross-section. However, it essentially translates the advantages of a horizontally elliptical curvature into the vertical curvature. Thus, the wearer will have clear vision throughout the angular range, upward and downward, with minimal optical distortion. Furthermore, elliptical vertical curvature allows the lens 151 to enclose a greater volume of air, just as elliptical horizontal curvature does, reducing risk of fogging even further. The embodiment of FIGS. 13–15 may be useful in goggles for swimming or skiing, but may also be used where complete sealing is not required. When incorporated into sunglasses, the vertical curvature aids in intercepting sunlight from above.

FIG. 16 illustrates a further embodiment of the present invention, in which a lens 161 conforms to an ellipsoid of revolution 162. The ellipsoid of revolution 162 is a special form of an ellipsoid which has circular cross-sections in planes orthogonal or perpendicular to the major axis 165, such as a cross-section 164 of FIG. 18. It may be conceived as the path traced out by an ellipse 166 which is revolved about its major axis 165. The resultant circular cross-section 164 has a maximum diameter equal to the length of a minor axis 167 of the revolved ellipse 166. Of course, a vertical profile 168 (FIG. 17) of the lens 161 forms a circular arc conforming to the circular cross-section 164. Ideal applications for such an embodiment are similar to those mentioned for the embodiment of FIGS. 13–15.

Note that the vertical curvature (profile 168) of the above-described lens 161 is dictated by the horizontal curvature (specifically, the length of the minor axis). Circular vertical curvature of a longer radius, however, may be desired so that the lens does not bulge too far from the eye.

Figures 19, 20:
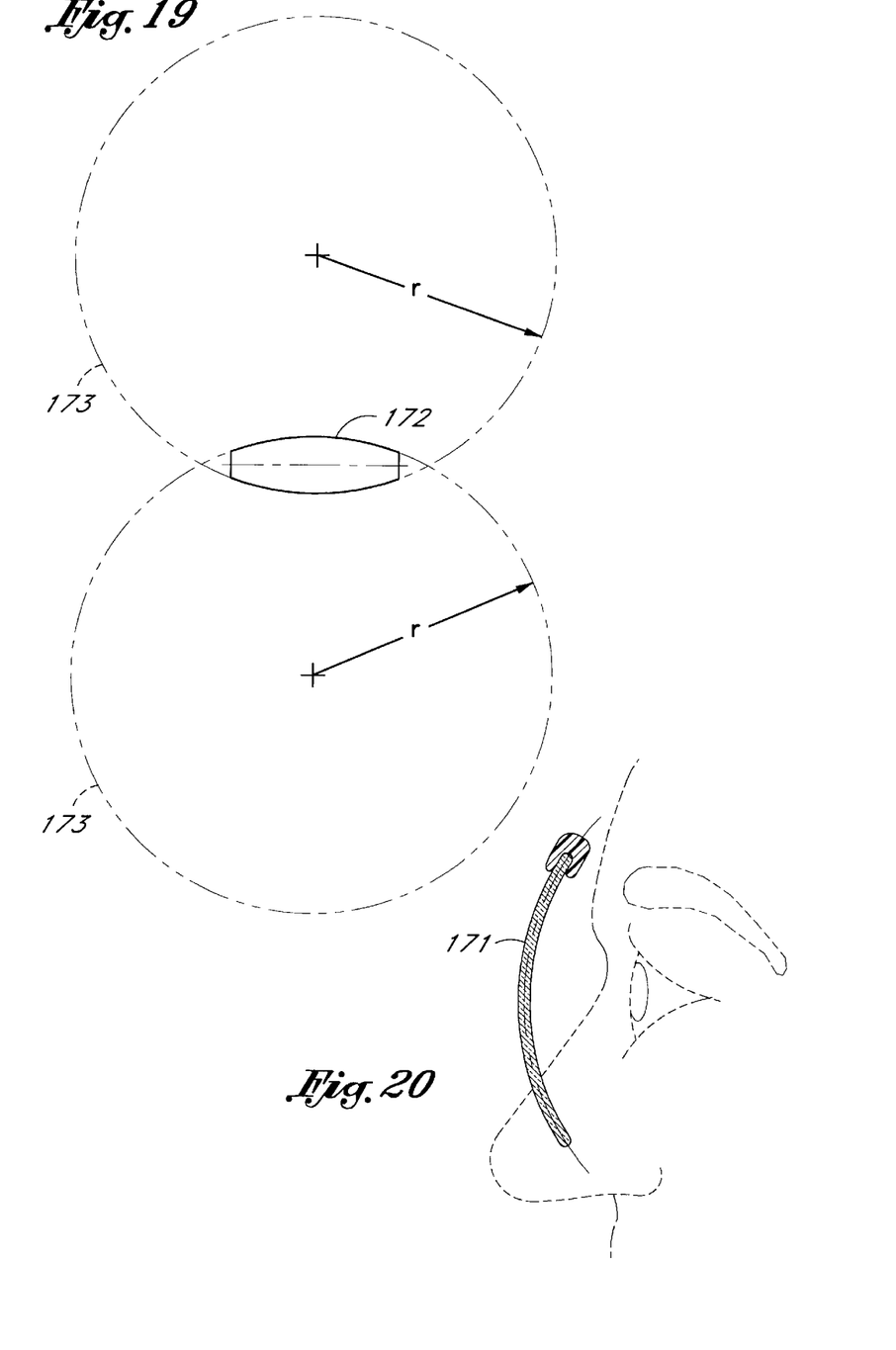
FIG. 19 is a cross-sectional view, like FIG. 18, of a different embodiment wherein the ellipsoid to which the lens conforms has vertical side sections comprising circular arcs of smaller angle and longer radius than those of FIG. 18.
FIG. 20 is a vertical cross-sectional view of the lens of FIG. 19, with the face of a wearer shown in phantom.

FIG. 19 is a cross-sectional view, like FIGS. 15 and 18, of an ellipsoid 172 formed of circular arcs 173 having radii of curvature r which are long relative to the elliptical dimensions (not shown). FIG. 20 is a vertical profile of a lens 171 conforming to such an ellipsoid 172, shown on the face of a wearer. By varying the radius of vertical curvature relative to the horizontal curvature, a lens may also be arranged to place the wearer's pupil at the center of curvature. In this fashion, the angle of incidence in the vertical dimension may be set at 0° (normal to the lens) throughout the vertical angular range of vision.

FIGS. 21 and 22 illustrate an embodiment of the present invention wherein an eyewear 180 incorporates dual lenses 181, both of which are mounted to conform to a single ellipse 182. The two lenses 181 together function much as the above-described unitary lens embodiment, and they may similarly incorporate any of a great variety of vertical curvatures. One difference of optical significance is the absence of a medial lens section about an apex 183 of the ellipse 181. However, the medial section is most often of minor importance in filtering light due to natural binocular/stereo vision in humans, as is well known in this art. When the frame 184 and earstems 185 are arranged to seat the lenses 181 close to the eyes, the overlapping medial vision of two eyes covers substantially the same field of view as would be achieved through a unitary lens.

FIG. 23, on the other hand, illustrates a different embodiment, wherein an eyewear 190 incorporates dual lenses 191, each of which conforms to separate (though likely identical) ellipses 192. Elliptical lenses 191 in accordance with FIG. 23 can be used in conjunction with many different frame and earstem types known in the art. They are particularly useful in conjunction with eyewear having close-fitting lenses. The closer each lens 191 is positioned to the eye, the more advantage the wearer derives in terms of improved optical clarity. The skilled artisan will understand, in light of the foregoing discussion of angles of incidence for a unitary lens, that close-fitting elliptical lenses 191 entail more closely normal incident rays, than do prior art lenses (e.g., cylindrical, spherical, or planar lenses).

Although the foregoing invention has been described in terms of certain preferred embodiments, other embodiments will become apparent to those of ordinary skill in the art in view of the disclosure herein. Accordingly, the present invention is not intended to be limited by the recitation of preferred embodiments, but is intended to be defined solely by reference to the appended claims.

What is claimed:

1. An arcuately molded lens for eyeglasses for participation in active sports, such as biking, skiing, and the like, said lens comprising:

a unitary lens having a top edge and a bottom edge, the bottom edge having a nosepiece opening formed therein for mounting the lens on the nose of a wearer, the lens having a bridge portion over the nosepiece opening, the distance separating the lower edge of the bridge portion and the top edge of the lens being defined as $d_1$ and the distance separating the top edge of the lens and the bottom edge of the lens being defined as $d_2$, wherein $d_1$ is in the range of about ½ inch to 1½ inches, and $d_2$ is in the range of about 1¾ inches to 2¾ inches, said dimensions providing optimum interception of light rays while allowing ventilation around the face of the wearer while participating in active sports; and the lens having in its as-molded condition an arcuate cross-sectional configuration wherein the arc length (L) of said lens is in the range of from about 5½ inches to about 7½ inches, and wherein the horizontal arc of the lens has a medial portion and lateral ends, wherein the lateral ends have gradually tightening curvature relative to the curvature of the medial portion so that the horizontal arc of the lens conforms substantially to a portion of an ellipse.

2. An arcuately molded lens for eyeglasses, said lens being suitable for participation in active sports, such as biking, skiing, and the like, said lens comprising:

a unitary lens having an upper edge and a lower edge, said lower edge having a nosepiece opening formed therein for mounting said lens on the nose of a wearer, the distance separating the upper edge and the lower edge of the lens being in the range of from about 1 inches to about 2¾ inches, and said lens having a horizontal arcuate cross-sectional configuration with a medial portion of relatively mild curvature and lateral ends of relatively tight curvature in its as-molded condition which lies substantially on the surface of an ellipse.

3. The lens of claim 2, wherein said horizontal arcuate cross-sectional configuration comprises a central region and a pair of adjacent, lateral regions, the thickness of said lens through at least one point in said lateral regions being less than the average thickness of said lens in said central region.

4. The lens of claim 3, wherein the thickness of said lens tapers gradually from the central region to a reduced thickness in said lateral regions.

5. The lens of claim 3, wherein the maximum thickness of said lens is between about 0.050 and about 0.090 inch.

6. The lens of claim 5, wherein the thickness of said lens at a point approximately 45° along arc length L from a midpoint along the horizontal arc length L is from about 40% to about 99% of the thickness of said lens at said midpoint.

7. The lens of claim 6, wherein the thickness of said lens at a point about 45° along said arc length of said lens form said midpoint is about 75% to about 98% of the thickness of said lens at said midpoint.

8. The lens of claim 7, wherein the thickness of said lens at said midpoint is between about 0.060 to about 0.070 inches, and the thickness of said lens in each of said lateral regions is between about 0.040 and about 0.050 inches.

9. A lens for eyewear, having an outer, convex surface, an inner, concave surface, and a thickness therebetween, wherein at least one of said outer, convex surface and said inner, concave surface has an arcuate cross-sectional configuration with a medial portion and lateral ends said medial portion having less curvature than the curvature of the lateral ends along a horizontal plane, said arcuate cross-section conforming substantially to an ellipse having an eccentricity within the range of from about 0.10 to about 0.85.

10. The lens of claim 9, wherein said arcuate cross-sectional configuration of said lens along said horizontal plane is comprised of a medial region and a pair of adjacent, lateral regions, the thickness of said lens in said lateral regions tapering to a thickness that is less than the average thickness of said lens in said medial region.

11. The lens of claim 10, wherein the thickness of said lens tapers substantially evenly from the thickness at the midpoint of said medial region to a reduced thickness in said lateral regions.

* * * * *